(12) United States Patent
Dayal et al.

(10) Patent No.: US 8,724,545 B2
(45) Date of Patent: May 13, 2014

(54) METHOD AND APPARATUS TO FACILITATE SUPPORT FOR MULTI-RADIO COEXISTENCE

(75) Inventors: Pranav Dayal, San Diego, CA (US); Ashok Mantravadi, San Diego, CA (US); Tamer Adek Kadous, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 12/851,302

(22) Filed: Aug. 5, 2010

(65) Prior Publication Data

US 2011/0243094 A1    Oct. 6, 2011

Related U.S. Application Data

(60) Provisional application No. 61/356,960, filed on Jun. 21, 2010, provisional application No. 61/356,933, filed on Jun. 21, 2010, provisional application No. 61/319,322, filed on Mar. 31, 2010.

(51) Int. Cl.
    *H04Q 7/00*    (2006.01)

(52) U.S. Cl.
    USPC .......................................... 370/328; 370/331

(58) Field of Classification Search
    USPC .......................................... 370/328–331, 338
    See application file for complete search history.

(56) References Cited

U.S. PATENT DOCUMENTS

| | | | |
|---|---|---|---|
| 6,930,993 B1 * | 8/2005 | Hamada et al. | 370/347 |
| 7,787,398 B2 | 8/2010 | Liu et al. | |
| 7,929,432 B2 | 4/2011 | Zhu et al. | |
| 8,059,622 B2 | 11/2011 | Zhu | |
| 8,116,319 B2 | 2/2012 | Yoon et al. | |
| 8,160,001 B2 * | 4/2012 | Bitran | 370/328 |
| 8,218,487 B2 * | 7/2012 | Eliezer et al. | 370/329 |
| 2002/0071404 A1 * | 6/2002 | Park et al. | 370/331 |
| 2007/0054620 A1 * | 3/2007 | Zeira et al. | 455/63.1 |
| 2007/0291673 A1 | 12/2007 | Demirhan et al. | |
| 2008/0181179 A1 * | 7/2008 | Karaoguz | 370/331 |
| 2008/0240021 A1 | 10/2008 | Guo et al. | |
| 2009/0088177 A1 * | 4/2009 | Yang et al. | 455/452.2 |
| 2009/0257396 A1 * | 10/2009 | Eliezer et al. | 370/330 |
| 2010/0061326 A1 | 3/2010 | Lee et al. | |
| 2010/0067469 A1 * | 3/2010 | Gaal et al. | 370/329 |
| 2011/0243047 A1 | 10/2011 | Dayal et al. | |

FOREIGN PATENT DOCUMENTS

| | | |
|---|---|---|
| JP | 2006025083 A | 1/2006 |
| JP | 2011512104 A | 4/2011 |
| WO | WO2009137295 A2 | 11/2009 |
| WO | WO-2010027208 A2 | 3/2010 |
| WO | WO-2010073325 A1 | 7/2010 |

OTHER PUBLICATIONS

International Search Report and Written Opinion—PCT/US2011/030530—ISA/EPO—Jul. 27, 2011.

(Continued)

*Primary Examiner* — Hong Cho
(74) *Attorney, Agent, or Firm* — Rupit M. Patel

(57) ABSTRACT

A method of wireless communication includes identifying at least one current resource for which a coexistence issue is present. The method also includes submitting a message to a base station that includes information indicative of the coexistence issue for the current resource(s). The handover request may include information indicative of the resource for which the coexistence issue is present and/or a desired future resource.

25 Claims, 12 Drawing Sheets

(56) References Cited

OTHER PUBLICATIONS

3rd Generation Partnership Project; Technical Specification Group Radio Access Network; Evolved Universal Terrestrial Radio Access (E-UTRA); Physical Channels and Modulation (Release 9), 3GPP Standard; 3GPP TS 36.211, 3RD Generation Partnership Project (3GPP), Mobile Competence Centre: 650, Route Des Lucioles; F-06921 Sophia-Antipolis Cedex; France, No. V9.0.0, Dec. 10, 2009, pp. 1-85, XP050400685, [retrieved on Dec. 10, 2009].

CMCC: "Addition of LTE UE RF requirements for coexistence with WLAN", 3GPP DRAFT; R4-100707, 3rd Generation Partnership Project (3GPP), Mobile Competence Centre : 650, Route Des Lucioles ; F-06921 Sophia-Antipolis Cedex ; France, vol. RAN WG4, No. San Francisco, USA; 20100222, Feb. 16, 2010, XP050426101, [retrieved on Feb. 16, 2010] the whole document.

CMCC: "Coexistence etudes between LTE and WLAN", 3GPP DRAFT; R4-100706, 3rd Generation Partnership Project (3GPP), Mobile Competence Centre; 650, Route Des Lucioles; F-06921 Sophia-Antipolis Cedex; France, vol. RAN WG4. No. San Francisco, USA; 20100222, Feb. 16, 2010, XP050426100, [retrieved on Feb. 16, 2010].

Taiwan Search Report—TW100111443—TIPO—Oct. 16, 2013).

* cited by examiner

METHOD AND APPARATUS TO FACILITATE SUPPORT FOR MULTI-RADIO COEXISTENCE

CROSS-REFERENCE TO RELATED APPLICATIONS

The present application claims the benefit of U.S. Provisional Patent Application No. 61/319,322, filed Mar. 31., 2010, entitled "METHOD AND APPARATUS TO FACILITATE LTE SUPPORT FOR MULTI-RADIO COEXISTENCE," U.S. Provisional Patent Application No. 61/356,933 filed Jun. 21, 2010, entitled "METHOD AND APPARATUS TO FACILITATE SUPPORT FOR MULTI-:RADIO COEXISTENCE" and U.S, Provisional Patent Application No. 61/356,960 filed Jun. 21, 2010, entitled "METHOD AND APPARATUS TO FACILITATE LTE SUPPORT FOR MULTI-RADIO COEXISTENCE," the disclosures of which are expressly incorporated by reference herein in their entireties. The present application is also related to U.S. patent application Ser. No. 12/851,334, filed Aug. 5, 2012 and entitled "METHOD AND APPARATUS TO FACILITATE SUPPORT FOR MULTI-RADIO COEXISTENCE," the disclosure of which is expressly incorporated by reference herein in its entirety.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a position location e.g., Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith. It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with position location. Currently, there is no mechanism that can solve this issue because LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to inform handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency of other radios at the UE.

BRIEF SUMMARY

According to one aspect, a method for wireless communication, the method includes identifying at least one current resource for which a coexistence issue is present. The method also includes submitting a message to a base station that includes information indicative of the coexistence issue for the current resource(s).

In another aspect, an apparatus operable in a wireless communication system has means for identifying at least one current resource for which a coexistence issue is present. The apparatus also has means for submitting a message to a base station that includes information indicative of the coexistence issue for current resource(s).

In yet another aspect, a computer program product includes a computer-readable medium having code to identify at least one current resource for which a coexistence issue is present. The medium also has code to submit a message to a base station that includes information indicative of the coexistence issue for the current resource(s).

In still another aspect, an apparatus operable in a wireless communication system has a memory coupled to a processor for storing data. The processor is configured to identify at least one current resource for which a coexistence issue is present and to submit a message to a base station that includes information indicative of the coexistence issue for the current resource(s).

According to another aspect, a method of wireless communication includes receiving a message from a User Equipment (UE), the message including information indicating a coexistence issue for a current resource of the UE. The method also includes deciding, based on the received message, whether to continue using the current resource.

In another aspect, a system for wireless communication has means for receiving a message from a User Equipment (UE), the message including information indicating a coexistence issue for a current resource of the UE. The system also has means for deciding, based on the received message, whether to continue using the current resource.

In another aspect, a system for wireless communication has a memory; and a processor coupled to the memory. The processor is configured to receive a message from a User Equipment (UE). The message includes information indicating a coexistence issue for a current resource of the UE. The processor is also configured to decide, based on the received message, whether to continue using the current resource.

In still another aspect, a computer program tangibly stored on a computer readable medium for wireless communication includes code to receive a message from a User Equipment (UE). The message includes information indicating a coexistence issue for a current resource of the UE. The medium also has code to decide, based on the received message, whether to continue using the current resource.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Various aspects of the disclosure provide techniques to mitigate coexistence issues in multi-radio devices. As explained above, some coexistence issues persist because an eNB is not aware of interference on the UE side that is experienced by other radios. According to one aspect, a UE identifies existing or potential coexistence issues and sends a handover request to the eNB. The handover request can include an identification of resources experiencing coexistence issues, an identification of desired resources, a reason for the coexistence issues, or any other helpful information. If the eNB then grants the request, the handover is performed. The handover can switch the current LTE communications to another channel and/or to another Radio Access Technology (RAT).

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). cdma2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Figure 1:
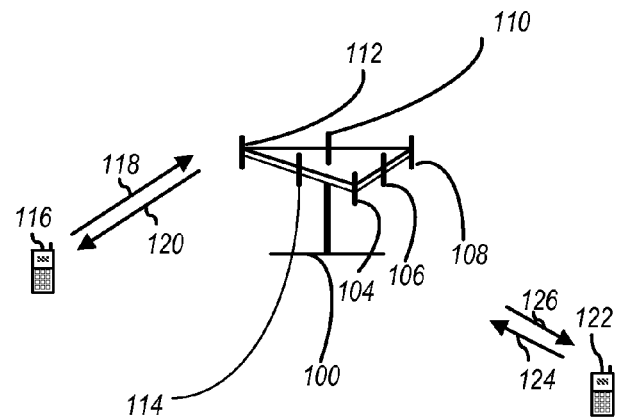
FIG. 1 illustrates a multiple access wireless communication system according to one aspect.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In an FDD system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
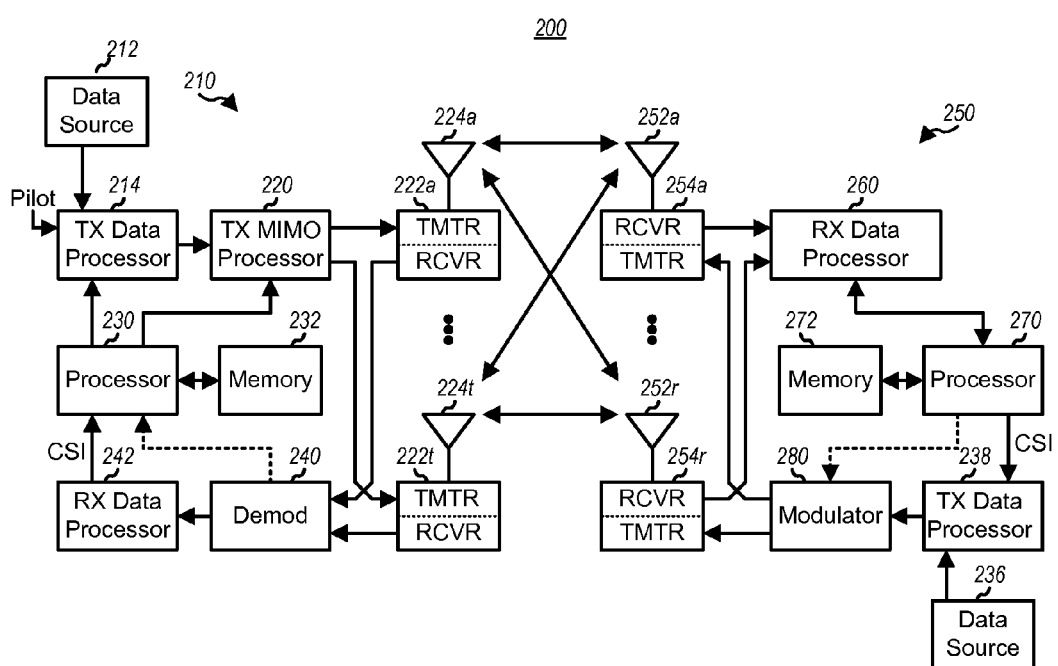
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
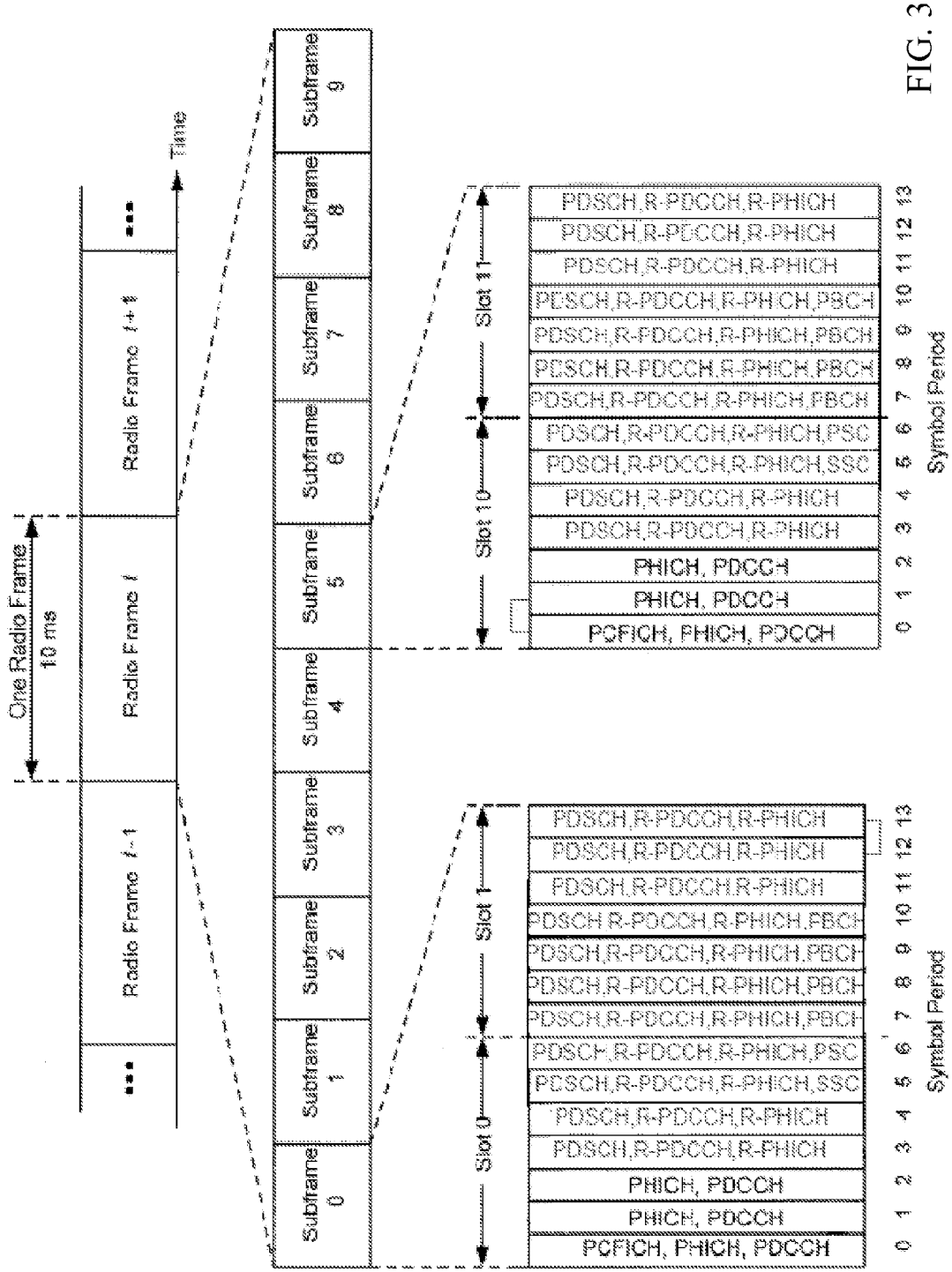
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
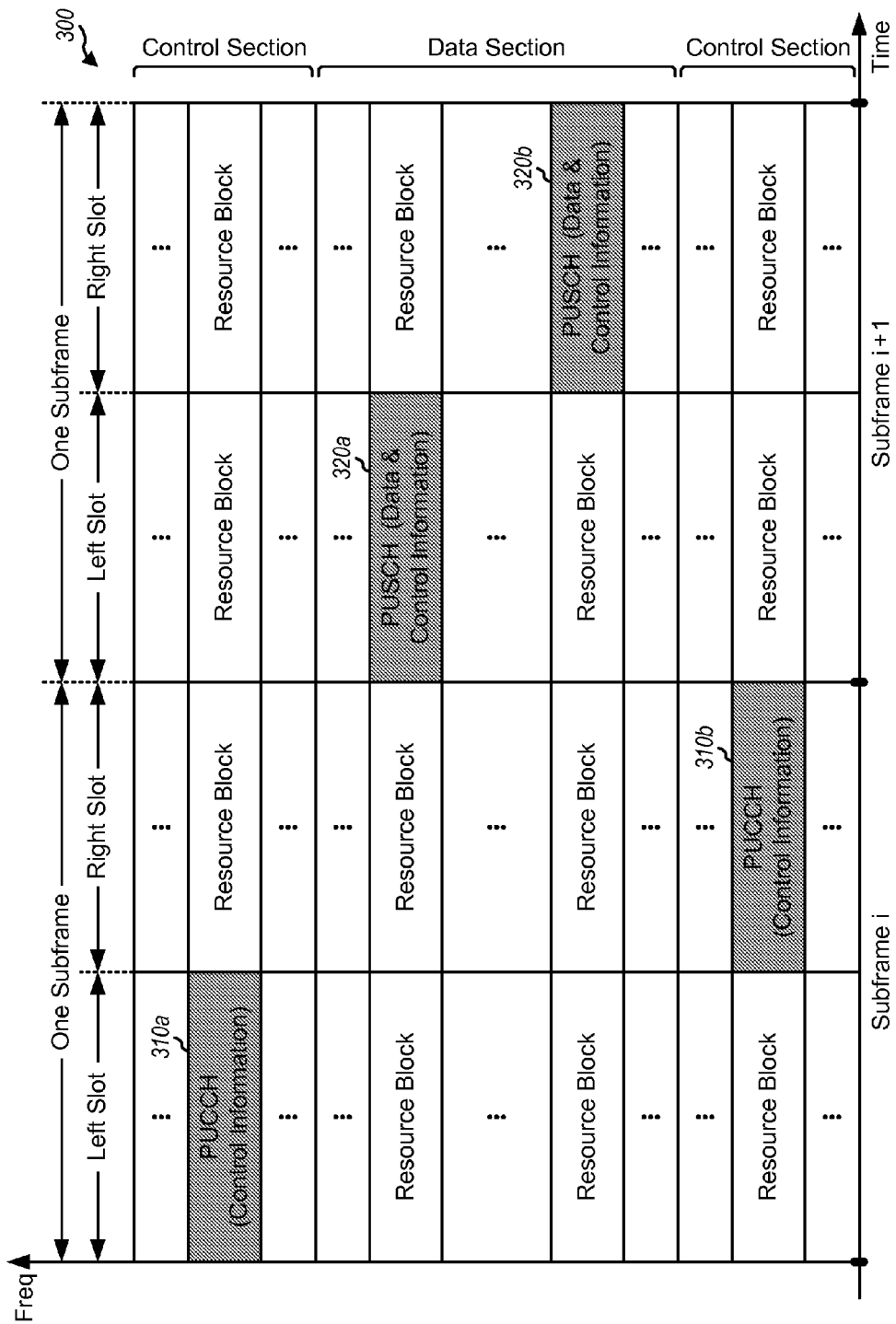
FIG. 4 is a block diagram conceptually illustrating an exemplary frame structure in uplink Long Term Evolution (LTE) communications.

FIG. 4 is a block diagram conceptually illustrating an exemplary frame structure 300 in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
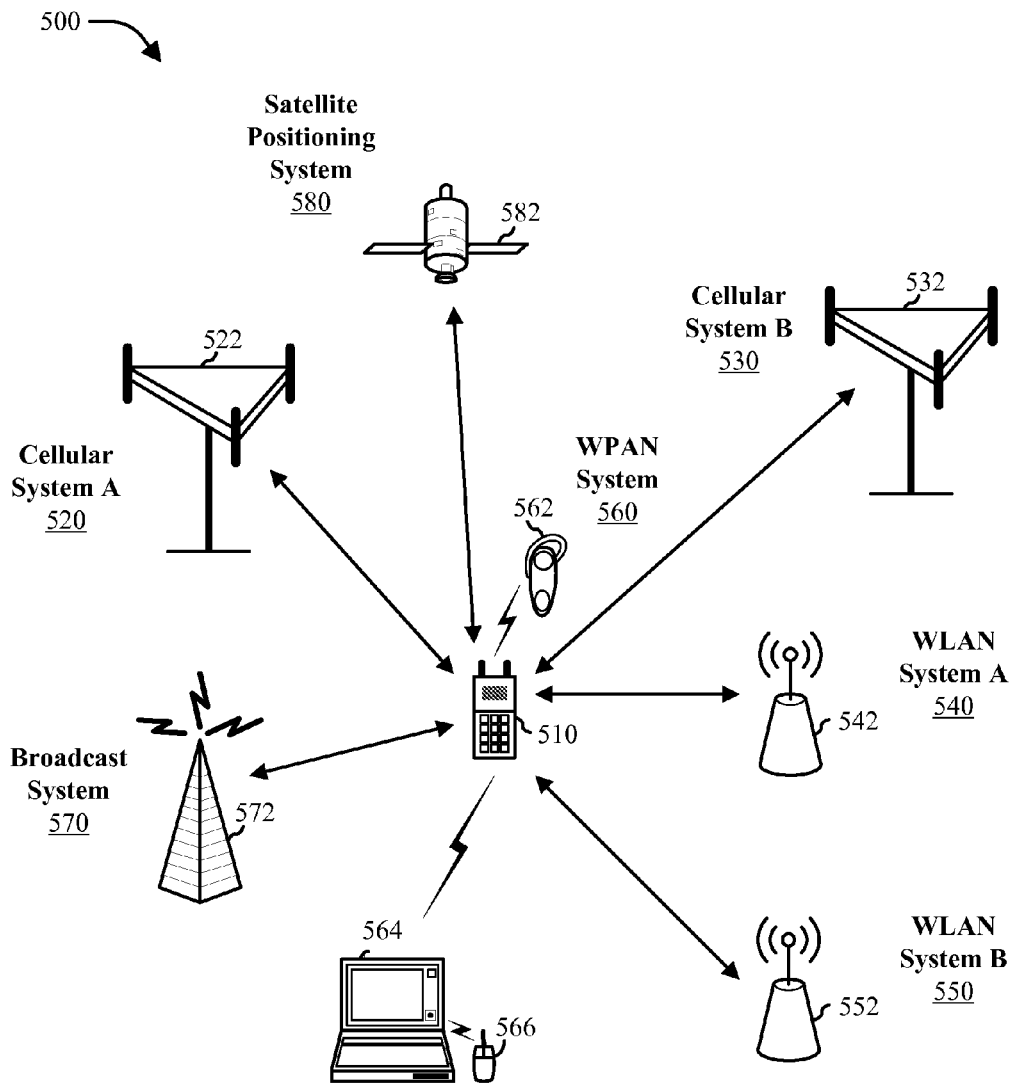
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices (s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
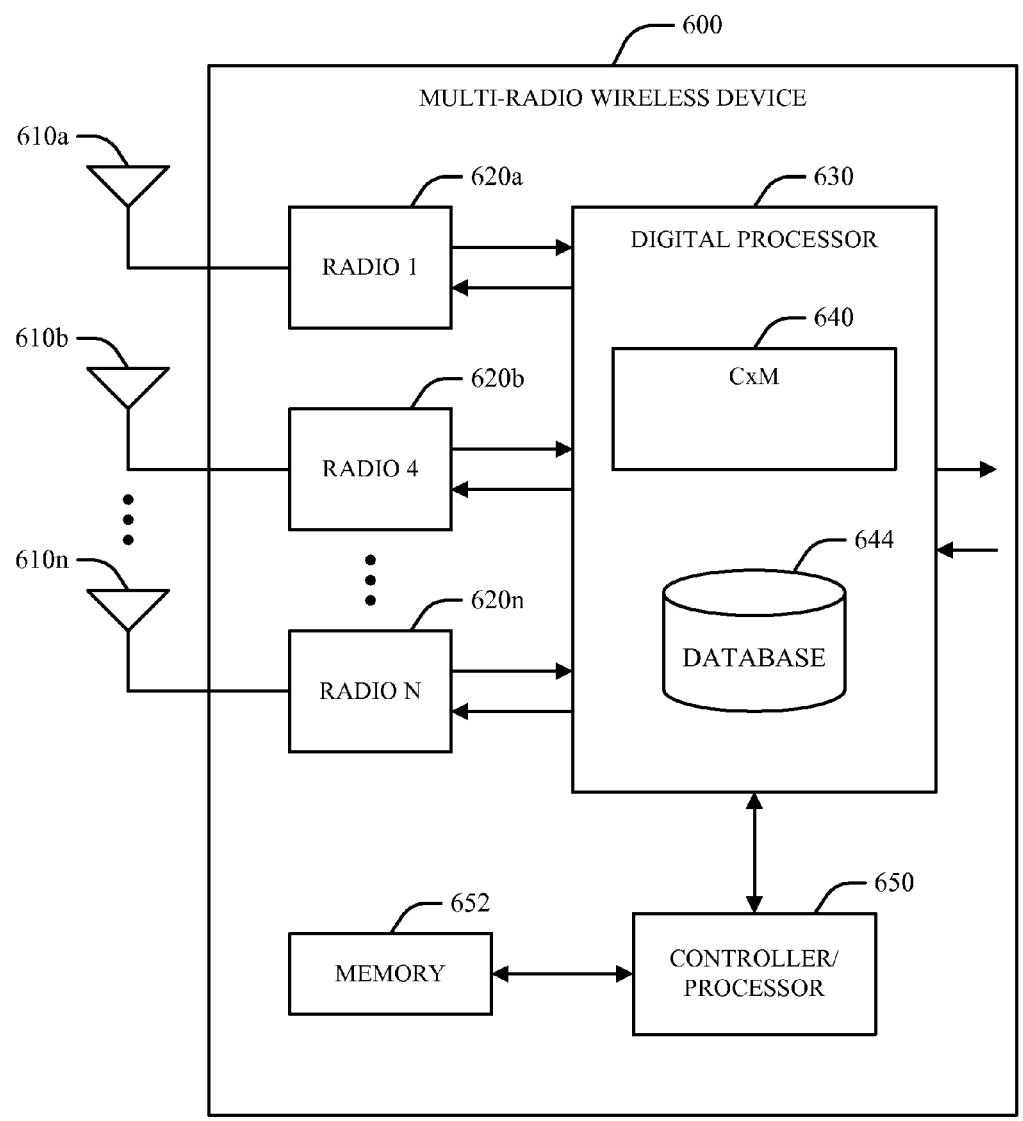
FIG. 6 is a block diagram of an example design for a multi-radio wireless device.

Turning next to FIG. 6, a block diagram is provided that illustrates an example design for a multi-radio wireless device 600 and may be used as an implementation of the wireless device 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
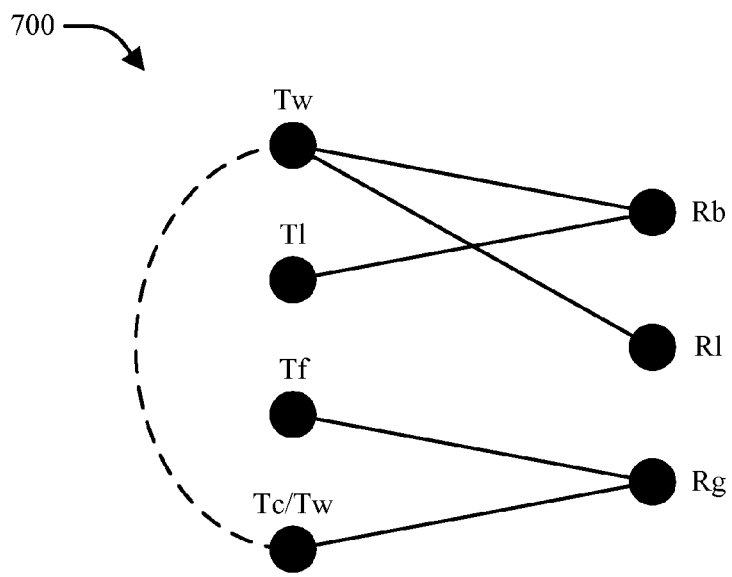
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as those illustrated in FIGS. 11, 13, and 14. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
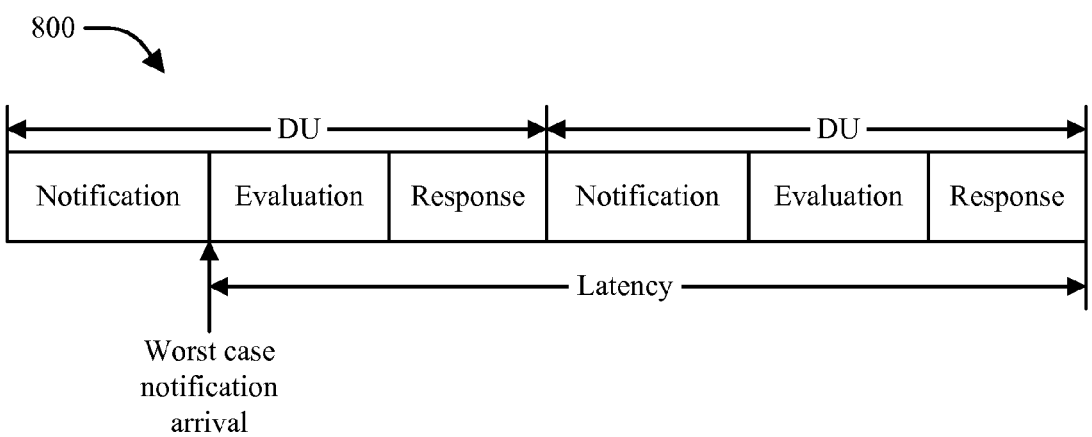
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

In-device coexistence problems can exist with respect to a UE between resources such as, for example, LTE and ISM bands (e.g., for Bluetooth/WLAN). In current LTE implementations, any interference issues to LTE are reflected in the DL measurements (e.g., Reference Signal Received Quality (RSRQ) metrics, etc.) reported by the UE and/or the DL error rate which the eNB can use to make inter-frequency or inter-RAT handoff decisions to, e.g., move LTE to a channel or RAT with no coexistence issues. However, it can be appreciated that these existing techniques will not work if, for example, the LTE UL is causing interference to Bluetooth/WLAN but the LTE DL does not see any interference from Bluetooth/WLAN. More particularly, even if the UE autonomously moves itself to another channel on the UL, the eNB can in some cases handover the UE back to the problematic channel, for example, for load balancing purposes. In any case, it can be appreciated that existing techniques do not facilitate use of the bandwidth of the problematic channel in the most efficient way.

Figure 9:
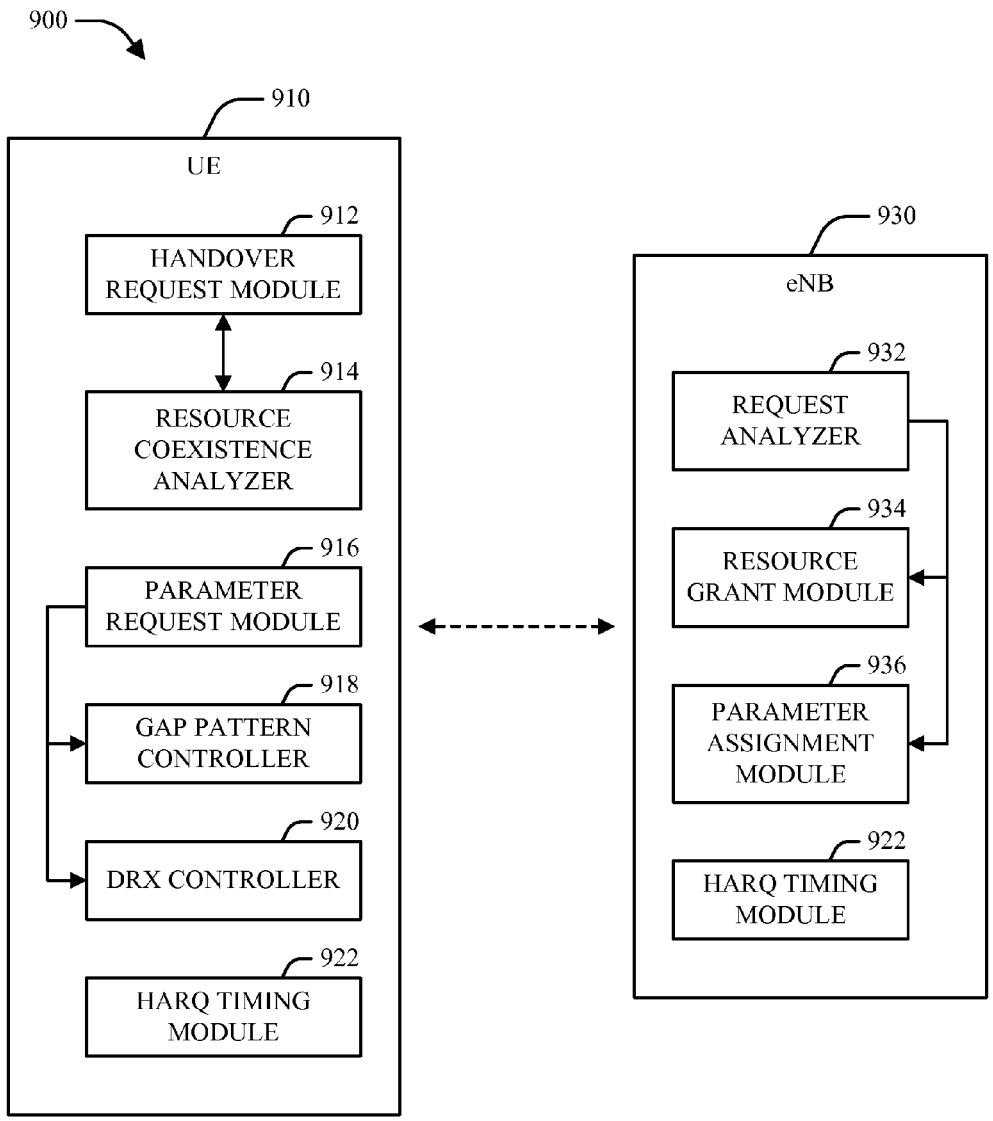
FIG. 9 is a block diagram of a system for providing support within a wireless communication environment for multi-radio coexistence management according to one aspect.

Turning now to FIG. 9, a block diagram of a system 900 for providing support within a wireless communication environment for multi-radio coexistence management is illustrated. In an aspect, the system 900 can include one or more UEs 910 and/or eNBs 930, which can engage in UL, DL, and/or any other suitable communication with each other and/or any other entities in the system 900. In one example, the UE 910 and/or eNB 930 can be operable to communicate using a variety of resources, including frequency channels and subbands, some of which can potentially be colliding with other radio resources (e.g., a Bluetooth radio). Thus, the UE 910 can utilize various techniques for managing coexistence between multiple radios utilized by the UE 910, as generally described herein.

To mitigate at least the above shortcomings, the UE 910 can utilize respective features described herein and illustrated by the system 900 to facilitate support for multi-radio coexistence within the UE 910. The various modules 912-922 may, in some examples, be implemented as part of a coexistence manager such as the CxM 640 of FIG. 6.

In a first aspect, a handover request module 912 and/or other mechanisms associated with the UE 910 can be configured to provide a message to the eNB 930 that allows the UE 910 to initiate an inter-frequency or inter-RAT handover. In one example, a message provided by the handover request module 912 can contain a white list, blacklist, and/or other suitable indicator(s) of frequencies and/or other resources that do not see a coexistence problem at the UE 910 (e.g., as determined by a resource coexistence analyzer 914 and/or other component). In another example, a message provided by the handover request module 912 can indicate that a coexistence issue has passed.

In a second aspect, a parameter request module 916 associated with the UE 910 can be configured to provide a message to the eNB 930 that allows the UE 910 to request the parameters and or a range of parameters associated with the measurement gap pattern and/or DRX mode used within the system 900. in one example, such a message can also indicate release of these settings. Such aspect is described in more detail in U.S. patent application Ser. No. 12/851,334, filed Aug. 5, 2012 and entitled "METHOD AND APPARATUS TO FACILITATE SUPPORT FOR MULTI-RADIO COEXISTENCE," which is incorporated by reference herein in its entirety.

With respect to messages provided by the handover request module 912 or the parameter request module 916 to the eNB 930, a request analyzer 932 and/or other component associated with the eNB 930 can analyze a received request and determine whether a UE 910 from which the request is received is utilizing a problematic frequency band and/or other resources. In the event the UE 910 is determined to be utilizing problematic resources, a resource grant module 934 and/or a parameter assignment module 936 can be utilized by the eNB 930 to grant resources associated with a requested handover and/or a requested set of measurement gap or DRX parameters, respectively.

In a third aspect, a gap pattern controller 918 and/or other mechanisms associated with the UE 910 can utilize one or more new specific gap patterns (e.g., as obtained via parameter request module 916 or other appropriate means), which can be provided for, e.g., TDM solutions between LTE and BT/WLAN.

Similarly, in a fourth aspect, a DRX controller 920 and/or other mechanisms associated with the UE 910 can facilitate operation of the UE 910 according to one or more new specific DRX mode parameters (e.g., as obtained via parameter request module 916 or other appropriate means).

In a fifth aspect, UL HARQ can be modified at the UE 910 and/or eNB 930 (e.g., via a HARQ timing module 922 at the UE 910 and/or eNB 930) in order to prevent transmissions by UE 910 beyond a predefined time in DRX.

Figure 10:
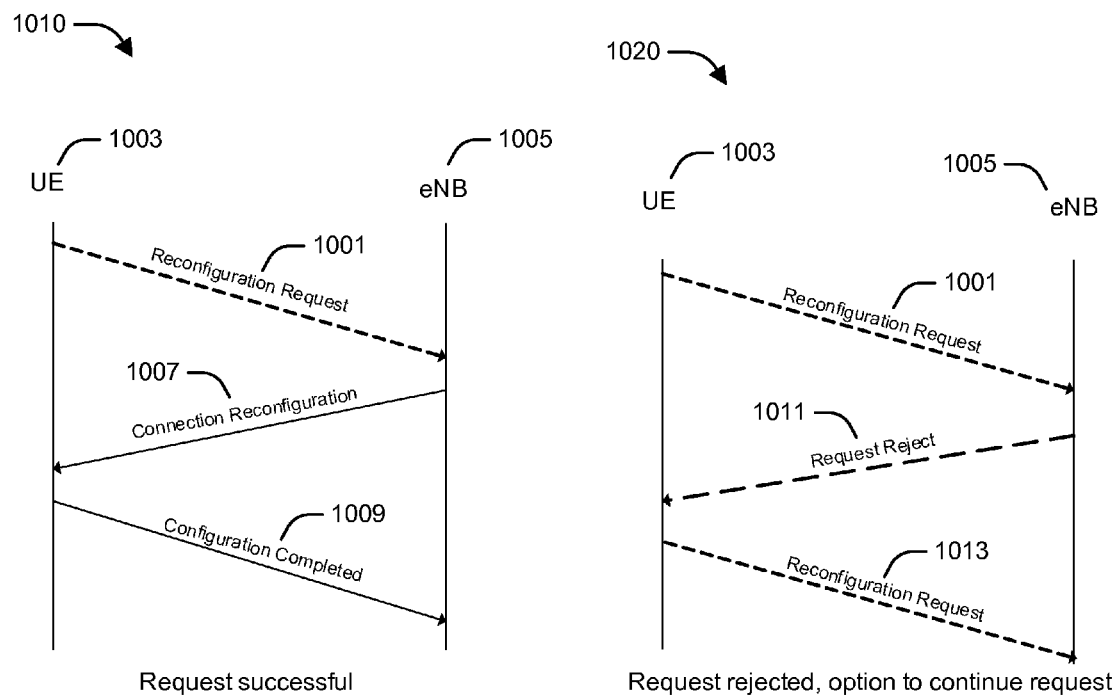
FIG. 10 illustrates example call flow diagrams showing use of messages according to one aspect of the disclosure.

FIG. 10 illustrates example call flow diagrams 1010, 1020 showing use of messages according to one aspect. In this example, new tools are added to Radio Resource Control (RRC) connection management messaging provided by the LTE specifications. RRC protocol handles the Layer 3 control plane signaling and controls behavior of the UE 1003 including System Information (SI) broadcasting, connection control such as handover within LTE, network-controlled inter-Radio Access Technology (RAT) mobility and measurement configuration and reporting.

In one aspect, a new reconfiguration request message 1001, is added to an LTE communication system and is sent from a UE 1003 to an eNB 1005 to initiate a handover. In the scenario 1010, a handover request is sent from the UE 1003 to the eNB 1005, and the request is successful. Specifically in one aspect, a RRCConnectionReconfigurationRequest message is sent to the eNB 1005 to initiate a handover. In one example, the UE 1003 requests a frequency handover from a problem channel to another channel. The reconfiguration request message 1001 can include a reason for the request (e.g., Bluetooth ON), a range of requested values (e.g., requested channels), and/or any other useful information. It is possible to include in the reconfiguration request message 1001*a* "white list" (e.g., a list of desired resources, such as desired channels) and/or a "black list" (e.g., a list of resources to avoid, such as channels experiencing coexistence issues).

The eNB 1005 processes the request. In the scenario 1010, the eNB 1005 grants the request by allocating one or more other frequency channels to the UE 1003. A connection reconfiguration message 1007 (e.g., a RRCConnectionReconfiguration message) 1007 is sent from the eNB 1005 to the UE 1003 informing the UE 1003, e.g., of the request grant and of the allocated resources. The UE 1003 then reconfigures, and when it has completed reconfiguration, the UE 1003 sends a configuration completed message 1009 (e.g., a RRCConnectionReconfigurationComplete message) back to the eNB 1005.

In another example, the UE 1003 requests a handover from one RAT to another RAT, where the communications taking place on LTE are switched to another RAT. In such an example, the new reconfiguration request message 1001 (e.g., a MobilityFromEUTRARequest message) may include a reason for the request (e.g., Bluetooth ON), a range of requested values (e.g., a different RAT resource), and/or any other useful information. The eNB 1005 processes the request and sends the connection reconfiguration message 1007 to give the UE 1003 permission to switch from one RAT to another. When the UE 1003 switches to another RAT, the UE 1003 follows the messaging associated with the new RAT. Some RATs may not support configuration complete messages, so in some instances there is not a configuration complete message 1009 to the eNB 1005 after a RAT handover.

The process illustrated in the scenario 1010 differs from conventional LTE processes. For instance, the UE 1003 is given some ability to direct its own operation through use of the reconfiguration request message 1001, which can suggest other resources for allocation. Additionally, when interference affects an uplink signal but not a downlink signal (and, thus, the eNB 1005 is unaware of the coexistence issue), the UE 1003 initiates the reconfiguration, thereby assuring action is taken in response to the coexistence issue. By contrast, in conventional LTE only the eNB 1005 initiates handoffs, and the handoffs are based on UE downlink channel measurements only. Also, the eNB 1005 is given more information regarding interference than in some conventional LTE systems. For instance, in conventional systems, there is no technique for the eNB to become aware of the timing of other radios in a UE or to become aware that another UE radio has turned ON/OFF. In various aspects of the disclosure, the handover request and/or other signaling from the UE can provide such information to the eNB. The eNB 1005 is less likely to force the UE 1003 back onto the resource with coexistence issues because the eNB 1005 is aware of the coexistence issues.

In the scenario 1020, the eNB 1005 rejects the reconfiguration request in the message 1001. The eNB 1005 sends a request reject message 1011 (e.g., a RRCConnectionReconfigurationRequestReject message) to the UE 1003 informing the UE 1003 that the request is rejected. The UE 1003 can then send a follow-up reconfiguration request message 1013 to either request the same resources again or to request resources different than in the first request. In one example, when a request for a channel reallocation is rejected, the UE 1003 may follow up by requesting a RAT reconfiguration (or vice versa). The UE 1003 may discontinue sending reconfiguration request messages to the eNB 1005 according to a number of factors, such as whether the coexistence issue has gone away or whether a maximum number of requests during a specified time have been sent. Additionally or alternatively, the UE 1003 may include a timer that controls how often reconfiguration request messages are sent.

Various examples can be adapted for any of a variety of scenarios that may occur during LTE operation. For instance, when an RRC connection is not already in place, an RRCConnectionRequest message (not shown) can include much of the information discussed above (e.g., white/black lists, a reason for the request, etc.). The eNB uses the information in the RRCConnectionRequest message to know that a coexistence issue exists and to assign a configuration to the UE to reduce or minimize coexistence issues when LTE activity is initiated.

An example of when an RRC connection is not already in place includes a scenario wherein a user is not currently making a phone call. When the user places the call, the RRC connection is established. An example of when an RRC connection is in place includes a scenario where a user is currently on an established call. In either case, an appropriate message is selected based on whether the RRC connection is in place. Also in either case, if the user uses Bluetooth while on the call, coexistence issues may present themselves.

In another example, a blind handover can be requested and/or allowed. In conventional LTE, handovers are initiated by an eNB when the eNB instructs the UE to perform measurement of interference in neighboring channels. The UE makes such measurements during a measurement gap where it does not transmit and does not process downlink information corresponding to the serving eNB. The UE reports the measurement data to the eNB after the measurement gap. In conventional LTE, inter-frequency handovers are accomplished after a measurement gap is concluded in which the eNB uses the reported data to select a channel for handover. However, in some present aspects, the UE has interference information by virtue of its knowledge of coexistence issues, even if no measurement gap has taken place. The UE can use the interference information to propose a channel or RAT for handover. Accordingly, blind handovers (where no measurement gap has taken place) can be used in some instances.

In yet another example, the UE 1003 can be configured to send a message to the eNB when certain events occur. For instance, if an LTE transfer is ongoing and another radio transfer becomes active (e.g., Bluetooth), the UE 1003 can send a reconfiguration request message. If another radio transfer is ongoing (e.g., Bluetooth) and LTE becomes active, a connection request message can be sent that includes a request for certain resources. Furthermore, after a condition terminates (e.g., after Bluetooth or WLAN turns off), a message (not shown) may be sent by the UE 1003 to the eNB 1005 alerting the eNB 1005 that the coexistence cause no longer exists, thereby freeing up resources in some instances.

Figure 11:
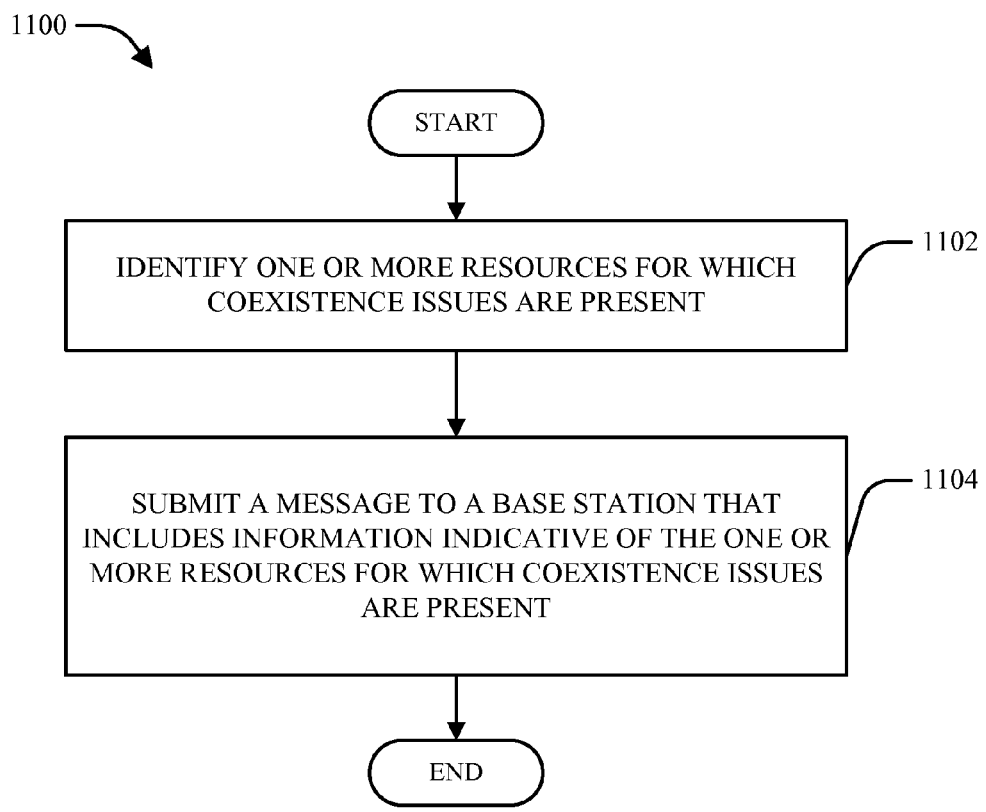
FIG. 11 is a block diagram showing implementation of multi-radio coexistence functionality within a wireless communication system according to one aspect.

FIG. 11 illustrates a methodology 1100 that facilitates implementation of multi-radio coexistence functionality within a wireless communication system. At block 1102, one or more resources for which coexistence issues are present are identified. The identification recognizes that unacceptable performance occurs or is expected to occur due to interference. In one example, a device with multiple radios is equipped to detect interference. Additionally or alternatively, the device may be programmed to know that when certain radios use certain channels, coexistence issues are necessarily present. Additionally or alternatively, the device may be programmed to know that certain radios operating at the same time will necessarily have coexistence issues. Coexistence issues may be identified, e.g., by CxM 640 of FIG. 6. At block 1104, a message is sent to a base station that includes information indicative of the resource(s) for which coexistence issues are present. In one embodiment, a handover request message is submitted to a serving eNB that includes information indicative of the one or more sets of resources for which coexistence issues are present. In one example, the handover request includes a reconfiguration request message or a connection request message such as those described above.

Figure 12:
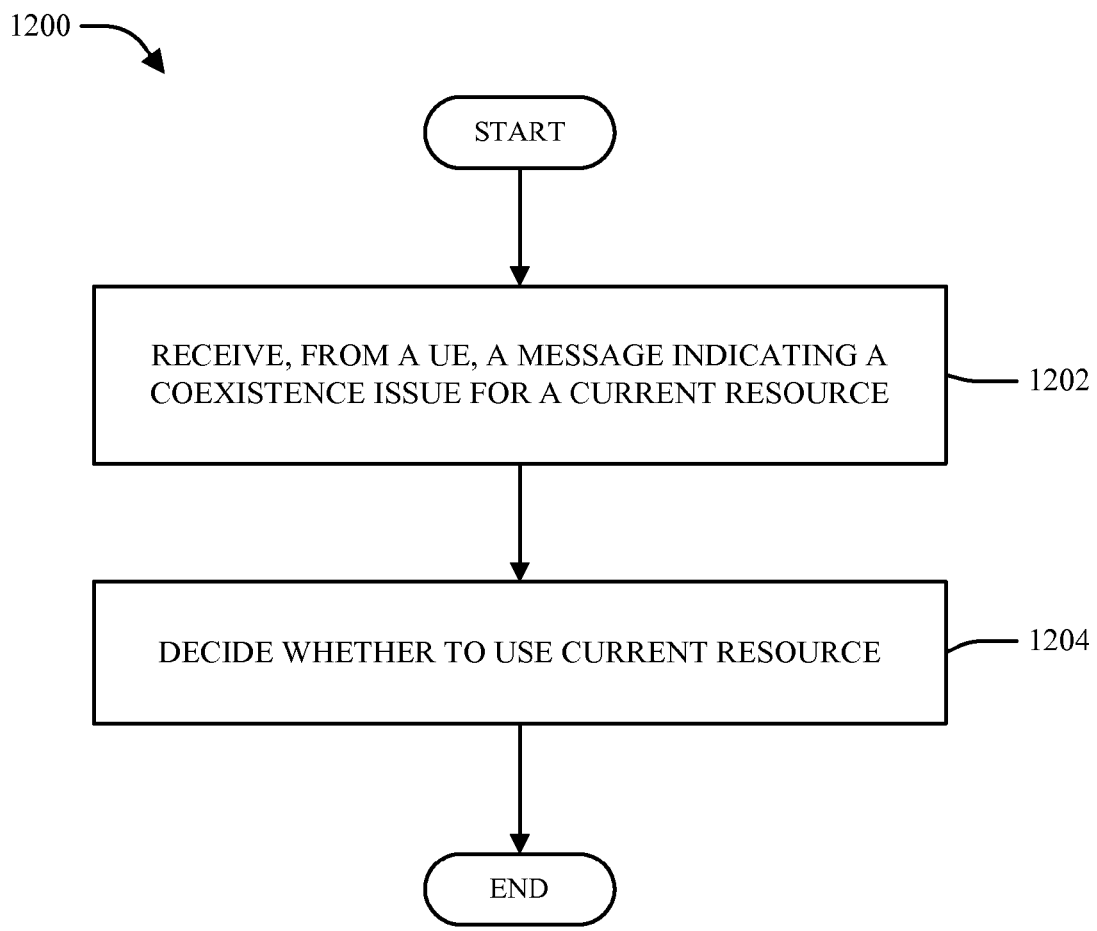
FIG. 12 is a block diagram showing implementation of multi-radio coexistence functionality within a wireless communication system according to one aspect of the disclosure.

FIG. 12 illustrates a methodology 1200 that facilitates implementation of multi-radio coexistence functionality within a wireless communication system. The methodology 1200 may be performed, e.g., by an eNB and, specifically, by a computer such as the computer 115 of FIG. 1. At block 1202, a message is received from a UE. The message indicates a coexistence issue with a current resource, e.g., a radio. At block 1204, it is decided whether to use the current resource, based on the reported coexistence issue.

In one embodiment, a handover request and/or the parameter request is received from the UE and granted. In one example, the request is granted upon determining that the set of resources utilized by the served UE is associated with a coexistence issue, though the scope of aspects is not so limited. For instance, the request can be granted for any reason, including determining that the requested resources are available, whether or not a coexistence issue exists.

Figure 13:
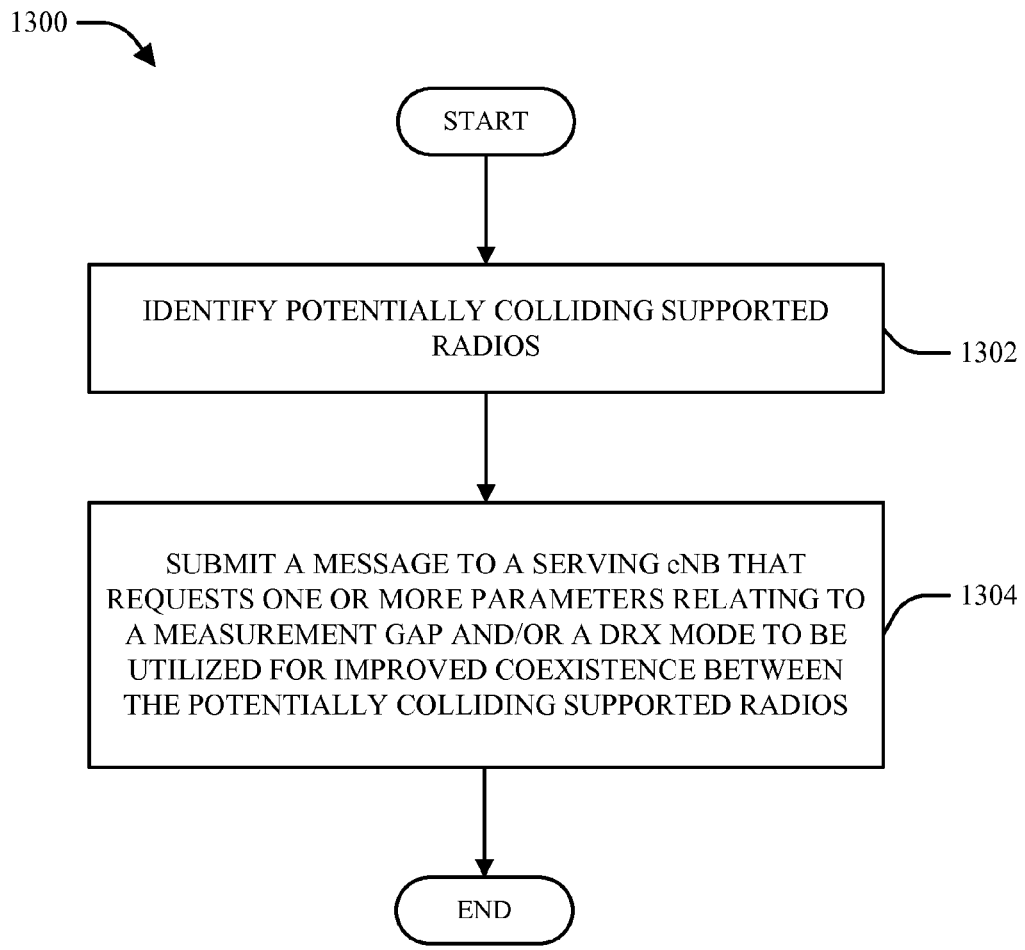
FIG. 13 illustrates a second methodology that facilitates implementation of multi-radio coexistence functionality within a wireless communication system according to one aspect.

FIG. 13 illustrates a second methodology 1300 that facilitates implementation of multi-radio coexistence functionality within a wireless communication system. At block 1302, potentially colliding supported radios are identified. At block 1304, a message is submitted to a serving eNB that requests one or more parameters relating to a measurement gap and/or a DRX mode to be utilized for improved coexistence between the potentially colliding supported radios.

Figure 14:
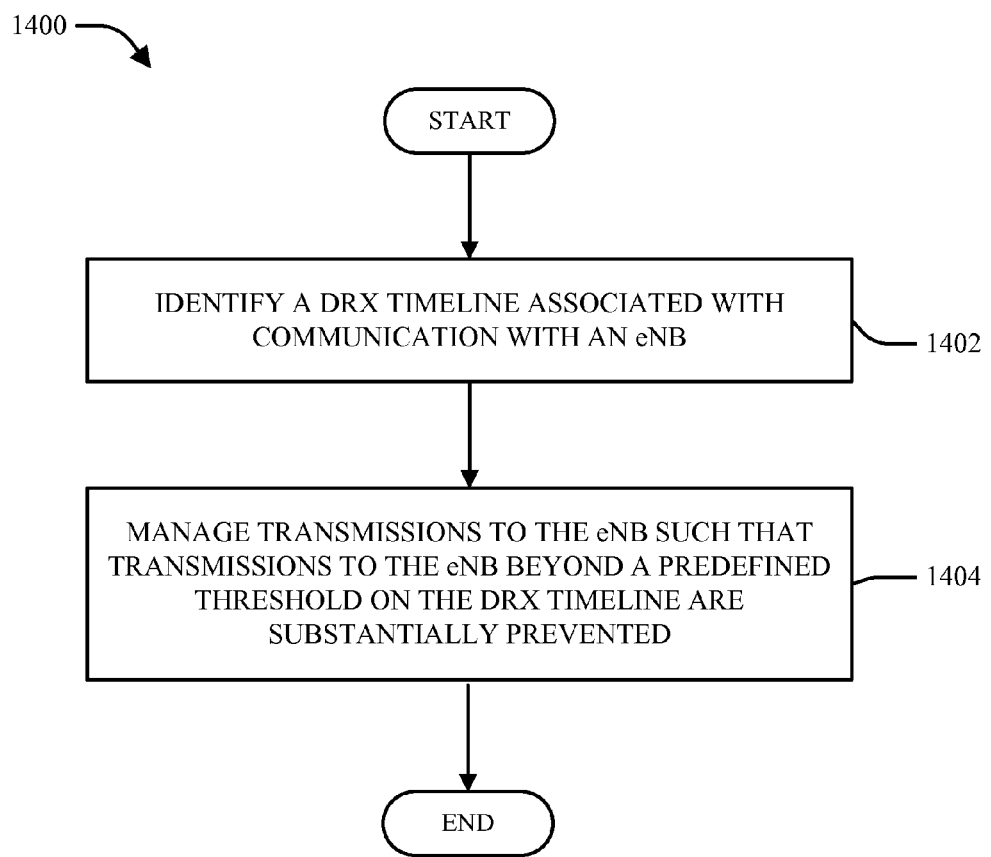
FIG. 14 illustrates a third methodology that facilitates implementation of multi-radio coexistence functionality within a wireless communication system according to one aspect.

FIG. 14 illustrates a third methodology 1400 that facilitates implementation of multi-radio coexistence functionality within a wireless communication system. At block 1402, a DRX timeline associated with communication with an eNB is identified. At block 1404, transmissions to the eNB are managed such that transmissions to the eNB beyond a predefined threshold on the DRX timeline are substantially prevented.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communication, the method comprising:
   identifying a first radio access technology (RAT) of a user equipment (UE) for which a coexistence issue with a second RAT of the UE is measured as present; and
   submitting a handover request message to a base station that includes information indicative of the coexistence issue for at least one currently utilized resource of the first RAT, the information including a black list of at least one communication resource for which the coexistence issue is measured as present in the first RAT and a white list of at least one communication resource for which the coexistence issue is measured as not present in the first RAT.

2. The method of claim 1, in which the information includes an indication of at least one desired future resource.

3. The method of claim 1, in which the handover request message comprises a request for at least one of an inter-frequency handover and an inter-Radio Access Technology (inter-RAT) handover.

4. The method of claim 1, in which the handover request message further comprises-a request to handover to a communication resource in the white list.

5. The method of claim 1, further comprising submitting a second message indicating a previous coexistence issue is no longer present.

6. An apparatus operable in a wireless communication system, the apparatus comprising:
   means for identifying a first radio access technology (RAT) of a user equipment (UE) for which a coexistence issue with a second RAT of the UE is measured as present; and
   means for submitting a handover request message to a base station that includes information indicative of the coexistence issue for at least one currently utilized resource of the first RAT, the information including a black list of at least one communication resource for which the coexistence issue is measured as present in the first RAT and a white list of at least one communication resource for which the coexistence issue is measured as not present in the first RAT.

7. The apparatus of claim 6, in which the information includes an indication of at least one desired future resource.

8. The apparatus of claim 6, wherein the handover request message comprises a request for at least one of an inter-frequency handover and an inter-Radio Access Technology (inter-RAT) handover.

9. A computer program product, comprising:
   a computer-readable medium comprising:
   code to identify a first radio access technology (RAT) of a user equipment (UE) for which a coexistence issue with a second RAT of the UE is measured as present; and
   code to submit a handover request message to a base station that includes information indicative of the coexistence issue for at least one currently utilized resource of the first RAT, the information including a black list of at least one communication resource for which the coexistence issue is measured as present in the first RAT and a white list of at least one communication resource for which the coexistence issue is measured as not present in the first RAT.

10. The computer program product of claim 9, in which the information includes an indication of at least one desired future resource.

11. The computer program product of claim 9, wherein the handover request message comprises a request for at least one of an inter-frequency handover and an inter-Radio Access Technology (inter-RAT) handover.

12. The computer program product of claim 9, further comprising code to send a second message indicating a previous coexistence issue is no longer present.

13. An apparatus operable in a wireless communication system, the apparatus comprising:
   a processor, configured to:
   a first radio access technology (RAT) of a user equipment (UE) for which a coexistence issue with a second RAT of the UE is measured as present, and
   to submit a handover request message to a base station that includes information indicative of the coexistence issue for at least one currently utilized resource of the first RAT, the information including a black list of at least one communication resource for which the coexistence issue is measured as present in the first RAT and a white list of at least one communication resource for which the coexistence issue is measured as not present in the first RAT, and
   a memory coupled to the processor for storing data.

14. The apparatus of claim 13, in which the information includes an indication of at least one desired future resource.

15. The apparatus of claim 13, wherein the handover request message comprises a request for at least one of an inter-frequency handover and an inter-Radio Access Technology (inter-RAT) handover.

16. The apparatus of claim 13, in which the processor is further configured to send a second message indicating a previous coexistence issue is no longer present.

17. The apparatus of claim 13, in which the handover request message further comprises a request to handover to a communication resource in the white list.

18. A method of wireless communication, the method comprising:
   receiving a handover request message from a User Equipment (UE), the handover request message including information indicating a coexistence issue measured as present with a second radio access technology (RAT) for a currently utilized resource of a first RAT of the UE, the information including a black list of at least one communication resource for which the coexistence issue is measured as present in the first RAT and a white list of at least one communication resource for which the coexistence issue is measured as not present in the first RAT; and deciding, based on the received handover request message, whether to continue using the currently utilized resource in communications with the UE.

19. The method of claim 18, further comprising granting a handover based on the received message.

20. The method of claim 18, in which the information includes at least one desired future resource.

21. The method of claim 18, further comprising receiving a message from the UE comprising an indication that a previous coexistence issue is no longer present.

22. The method of claim 18, in which the handover request message further comprises a request to handover to a communication resource in the white list.

23. A system for wireless communication, the system comprising:

means for receiving a handover request message from a User Equipment (UE), the handover request message including information indicating a coexistence issue measured as present with a second radio access technology (RAT) for a currently utilized resource of a first RAT of the UE, the information including a black list of at least one communication resource for which the coexistence issue is measured as present in the first RAT and a white list of at least one communication resource for which the coexistence issue is measured as not present in the first RAT; and means for deciding, based on the received handover request message, whether to continue using the currently utilized resource in communications with the UE.

24. A system for wireless communication, the system comprising:

a memory; and a processor coupled to the memory and configured:

to receive a handover request message from a User Equipment (UE), the handover request message including information indicating a coexistence issue measured as present with a second radio access technology (RAT) for a currently utilized resource of a first RAT of the UE, the information including a black list of at least one communication resource for which the coexistence issue is measured as present in the first RAT and a white list of at least one communication resource for which the coexistence issue is measured as not present in the first RAT; and to decide, based on the received handover request message, whether to continue using the currently utilized resource in communications with the UE.

25. A computer program tangibly stored on a computer readable medium for wireless communication, the medium comprising:

code to receive a handover request message from a User Equipment (UE), the handover request message including information indicating a coexistence issue measured as present with a second radio access technology (RAT) for a currently utilized resource of a first RAT of the UE, the information including a black list of at least one communication resource for which the coexistence issue is measured as present in the first RAT and a white list of at least one communication resource for which the coexistence issue is measured as being not present in the first RAT; and code to decide, based on the received handover request message, whether to continue using the currently utilized resource in communications with the UE.

* * * * *